(12) United States Patent
Lee et al.

(10) Patent No.: US 8,081,147 B2
(45) Date of Patent: Dec. 20, 2011

(54) LIQUID CRYSTAL DISPLAY DEVICE

(75) Inventors: Kyung Eon Lee, Suwon-si (KR); Sang Hee Yu, Gunpo-si (KR); Jae Sung Yu, Seoul (KR); Deuk Su Lee, Yongin-si (KR); Bu Yeol Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 603 days.

(21) Appl. No.: 12/256,984

(22) Filed: Oct. 23, 2008

(65) Prior Publication Data

US 2009/0295692 A1    Dec. 3, 2009

(30) Foreign Application Priority Data

May 27, 2008    (KR) .................. 10-2008-0049074

(51) Int. Cl.
  *G09G 3/36*    (2006.01)
(52) U.S. Cl. ................ 345/87; 345/92; 349/19
(58) Field of Classification Search ............ 345/87–100; 349/19, 33, 41–43
  See application file for complete search history.

(56) References Cited

U.S. PATENT DOCUMENTS

| | | | |
|---|---|---|---|
| 2005/0030441 A1* | 2/2005 | Song ................................ | 349/43 |
| 2006/0227088 A1* | 10/2006 | Jeon et al. ........................ | 345/87 |
| 2006/0250535 A1* | 11/2006 | Chae ................................ | 349/43 |
| 2006/0279668 A1* | 12/2006 | Paik et al. ........................ | 349/43 |
| 2007/0035676 A1* | 2/2007 | Hosoya ............................ | 349/43 |

FOREIGN PATENT DOCUMENTS

| CN | 1982960 | 6/2007 |
|---|---|---|
| JP | 2007-065239 | 3/2007 |

\* cited by examiner

*Primary Examiner* — Kimnhung Nguyen
(74) *Attorney, Agent, or Firm* — Birch, Stewart, Kolasch & Birch, LLP

(57) ABSTRACT

A liquid crystal display device having optical sensors, for sensing a touch, embedded in a liquid crystal panel to improve touch sensitivity is disclosed. The liquid crystal display device includes pixel regions spaced from each other on a first substrate, gate lines formed to separate the pixel regions in a first direction, driving voltage lines parallel to the gate lines, data lines formed between the pixel regions in a second direction intersecting the first direction, storage lines parallel to the driving voltage lines, read-out lines separated from neighboring data lines by one pixel region in the second direction, display transistors formed at intersections of the gate and data lines, pixel electrodes formed in the pixel regions, output switching transistors formed between the gate and read-out lines, capacitors formed between the output switching transistors and storage lines, and photo sensing transistors formed on the output switching transistors and storage lines.

9 Claims, 5 Drawing Sheets

LIQUID CRYSTAL DISPLAY DEVICE

CROSS-REFERENCE TO RELATED APPLICATION

This application claims the benefit of Korean Patent Application No. 10-2008-0049074, filed on May 27, 2008, which is hereby incorporated by reference in its entirety as if fully set forth herein.

BACKGROUND OF THE INVENTION

1. Field of the Invention

The present invention relates to a liquid crystal display device, and more particularly to a liquid crystal display device having optical sensors embedded in a liquid crystal panel to sense a touch and capable of preventing crosstalk by changing positions of read-out lines to improve touch sensitivity and a method for manufacturing the same.

2. Discussion of the Related Art

As an information-oriented society has been developed, a display field has been rapidly developed to visually express electrical data signals, and various flat display devices having excellent performances, such as thin profile, light weight, and low power consumption, have been developed and rapidly replaced a conventional cathode ray tube (CRT).

The flat display devices include a liquid crystal display device (LCD), a plasma display panel device (PDP), a field emission display device (FED), an electro luminescence display device (ELD) and the like. All the above-mentioned flat display devices essentially include a flat display panel to display an image. The flat display panel includes a pair of transparent insulating substrates, which are bonded to each other while an intrinsic luminescent or polarizing material layer is interposed therebetween.

Among those flat display devices, a liquid crystal display device displays an image by adjusting the light transmittance of liquid crystal using an electric field. Accordingly, the liquid crystal display device includes a display panel having liquid crystal cells, a hacklight unit for illuminating light onto the display panel, and driving circuits for driving the liquid crystal cells.

The display panel is configured such that a plurality of gate lines and a plurality of data lines intersect each other to define a plurality of unit pixel regions. In each of the pixel regions, there are provided a thin film transistor array substrate and a color filter substrate facing each other, a spacer positioned to maintain da specific cell gap between the two substrates, and liquid crystal filled in the cell gap.

The thin film transistor array substrate includes the gate lines and the data lines, thin film transistors serving as switching elements and formed at the intersections of the gate lines and the data lines, pixel electrodes formed in liquid crystal cell units and connected to the thin film transistors, and an alignment layer coated thereon. The gate lines and the data lines receive signals from the driving circuits through pads, respectively.

The thin film transistors supply pixel voltage signals supplied to the data lines to the pixel electrodes in response to scan signals supplied to the gate lines.

The color filter array substrate includes color filters formed in liquid crystal cell units, a black matrix provided to divide the color filters from each other and reflect external light, a common electrode for supplying a reference voltage to the liquid crystal cells in common, and an alignment layer coated thereon.

The thin film transistor array substrate and the color filter array substrate, which are separately manufactured, are aligned, and then are bonded to each other. Thereafter, liquid crystal is injected into a gap between the two substrates and the gap is sealed.

In the liquid crystal display device manufactured as described above, recently, optical sensors are formed inside the display panel to control a backlight unit according to the brightness of external light A touch panel, which has been attached to the outside of the display panel to cause an increase in volume, is intended to be installed inside the display panel.

Hereinafter, a conventional liquid crystal display device including optical sensors will be described with reference to the accompanying drawings.

FIG. 1 illustrates a cross-sectional view showing a conventional liquid crystal display device including optical sensors.

As shown in FIG. 1, the conventional liquid crystal display device including optical sensors includes a liquid crystal panel 10 having optical sensors 7, a plurality of optical films 11 positioned under the liquid crystal panel 10, a light source such as a lamp provided under the optical films 11, a backlight unit 20 for coupling and supporting the optical films 11 and the liquid crystal panel 10 disposed thereon, and a casing 30 for covering a side portion of the liquid crystal panel 10 excluding an upper surface thereof and the backlight unit 20.

In this case, the liquid crystal panel 10 includes a thin film transistor substrate 6 having the optical sensor 7 and a color filter substrate 5 facing each other. A liquid crystal layer (not shown) is formed between the color filter substrate 5 and the thin film transistor substrate 6 to perform a display function according to application of voltage.

Further, a passivation film 8 is positioned on the liquid crystal panel 10 to prevent damage of the liquid crystal panel 10 due to contact of the fingers.

The operation of the conventional liquid crystal display device including optical sensors is explained.

The optical sensors 7 of the thin film transistor substrate 6 detect illuminance of the backlight unit 20 and external light and detect the light reflected by a finger 1 or a shadowed portion to read touch coordinates when a touch action occurs, thereby sensing a touch. That is, in a portion where a touch has been made, the external light is shielded by the finger 1 and a portion of light emitted from the backlight unit 20 is reflected from the surface of the finger 1, thereby sensing a touch by a light emission amount.

In this case, output voltages of the optical sensors 7 are represented in a gray scale. One optical sensor provides one pixel value as in a picture. The touch coordinates are perceived by applying such an algorithm.

FIG. 2 illustrates a circuit diagram showing a conventional liquid crystal display device. FIG. 3 schematically shows a parasitic capacitance problem generated between a read-out line and a neighboring data line of FIG. 2.

As shown in FIGS. 2 and 3, in a general liquid crystal display device, a plurality of gate lines 41 and data lines 42a, 42b and 42c intersect each other to define pixel regions. Thin film transistors Tpixel are provided at intersecting portions of the gate lines 41 and the data lines 42a, 42b and 42c. A driving voltage line (VDRV) 43 and a storage voltage line (VSTO) 45 are spaced from each of the gate lines 41 in parallel. Further, pixel electrodes are formed in the pixel regions.

In this configuration, the data lines includes first to third data lines 42a, 42b and 42c of B, R and G colors, respectively. A read-out line 51 is formed adjacent to the second data line (red data line) 42b. The read-out line 51 is positioned between the outside of the pixel electrode of the neighboring first data line (blue data line) 42a and the second data line (red data line) 42b.

Each of the optical sensors 7 of FIG. 1 includes an output transistor Ta having a gate electrode connected to the previous gate line 41 and a drain electrode connected to the read-out line 51, a capacitor Cs formed between a source electrode of the output transistor Ta and the storage voltage line 45, and a sensing transistor Ts having a drain electrode connected to the source electrode of the output transistor Ta, a source electrode connected to the driving voltage line (VDRV) 43 and a gate electrode connected to the storage voltage line (VSTO) 45.

The operation of the optical sensor is explained. That is, a driving voltage of 12V is applied to the source electrode of the sensing transistor Ts through the driving voltage line 43, and a voltage of 0V is applied to the gate electrode of the sensing transistor Ts through the storage voltage line 45. When a certain amount of light is sensed in an active layer of the sensing transistor Ts, photo current is generated to flow from the source electrode to the drain electrode of the sensing transistor Ts through a channel according to the sensed light amount. The photo current flows to the capacitor Cs through the drain electrode of the sensing transistor Ts. Accordingly, charges generated by the photo current are accumulated in the capacitor Cs by the driving voltage line 43 and the storage voltage line 45. The charges accumulated in the capacitor Cs flow to the read-out line 51 through the output transistor Ta to be detected by a detection unit (read out IC) connected to the read-out line 51. It is determined whether a touch is made based on the value of the photo current.

That is, a signal detected in the detection unit connected to the read-out line 51 is changed according to the light amount sensed in the sensing transistor Ts. Accordingly, it is possible to sense an image, for example, a document, image scan, and touch input. The sensed image may be transmitted to a controller or the like or displayed on the screen of the liquid crystal display panel under the control of the user.

As shown in FIG. 3, a large parasitic capacitance 46 is formed between the read-out line 51 and the second data line (red data line) 42b, adjacent to each other and formed on the same layer, due to the optical sensor.

Further, a second parasitic capacitance is generated in the first data line (blue data line) 42a formed in the same pixel region as the read-out line 51. The second parasitic capacitance is smaller than the parasitic capacitance 46, but may influence the display.

Resultantly, vertical crosstalk may occur due to the parasitic capacitance and the second parasitic capacitance.

The vertical crosstalk is one of factors causing a malfunction in application of a touch algorithm. Particularly, in a normally white LCD in which a voltage is applied to red pixels and no voltage is applied to green and blue pixels, crosstalk of display increases.

An increase in crosstalk is caused by the position of the sensors. Recently, the sensors are positioned only at blue pixels. The sensors are provided at the nearest positions to the red data lines on the mask. Accordingly, a parasitic capacitance value between the read-out line and the red data line is the largest value, and there is variation in the sensing screen according to colors.

The conventional liquid crystal display device has the following problems.

When optical sensors are provided externally, it is impossible to manufacture a slim liquid crystal display device. In attachment of parts for connecting optical sensors to an internal liquid crystal panel, a large amount of parts and time are required.

Accordingly, when optical sensors are provided internally, the optical sensors are generally positioned at blue pixel regions. Particularly, the read-out lines for detecting a voltage or current value sensed by the optical sensors should be formed in parallel and adjacent to the data lines for displaying a red color, which are the nearest to the blue pixel regions. Thus, severe vertical crosstalk occurs at these positions due to generation of parasitic capacitance.

Further, the parasitic capacitance also influences the blue pixel regions at which the optical sensors are positioned.

Further, the amount of charges increases in the capacitors included in the optical sensors due to sensing of touch and the charges are transmitted to the storage voltage lines, thereby causing horizontal crosstalk due to distortion of a phase voltage applied to storage voltage lines.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device having optical sensors embedded in a liquid crystal panel to sense a touch and capable of preventing crosstalk by changing positions of read-out lines to improve touch sensitivity and a method for manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a plurality of pixel regions arranged on a first substrate to be spaced from each other; gate lines formed to separate the pixel regions in a first direction; driving voltage lines parallel to the gate lines; data lines formed between the pixel regions in a second direction intersecting the first direction; storage lines parallel to the driving voltage lines; read-out lines separated from neighboring data lines by one pixel region in the second direction; display transistors formed at intersecting portions of the gate lines and the data lines; pixel electrodes formed in the pixel regions; output switching transistors formed between the gate lines and the read-out lines; capacitors formed between the output switching transistors and the storage lines; and photo sensing transistors formed on the output switching transistors and the storage lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display device according to the present invention will be described in detail with reference to the accompanying drawings.

Figure 1:
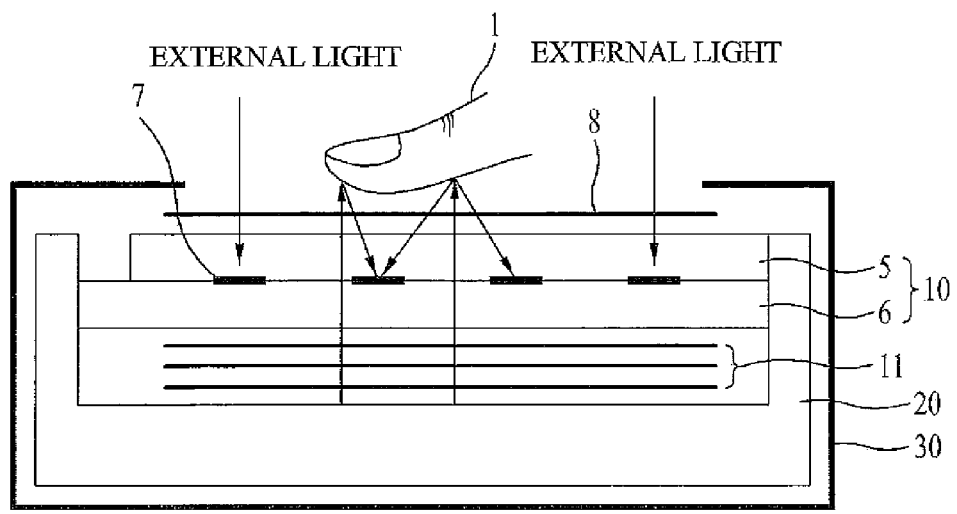
FIG. 1 illustrates a cross-sectional view showing a conventional liquid crystal display device including optical sensors.
Figure 2:
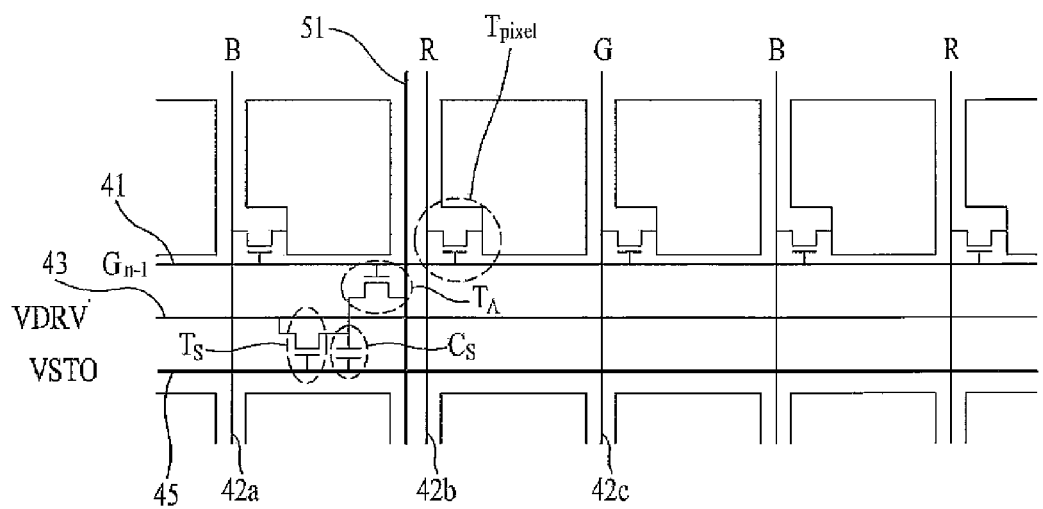
FIG. 2 illustrates a circuit diagram showing the conventional liquid crystal display device.
Figure 3:
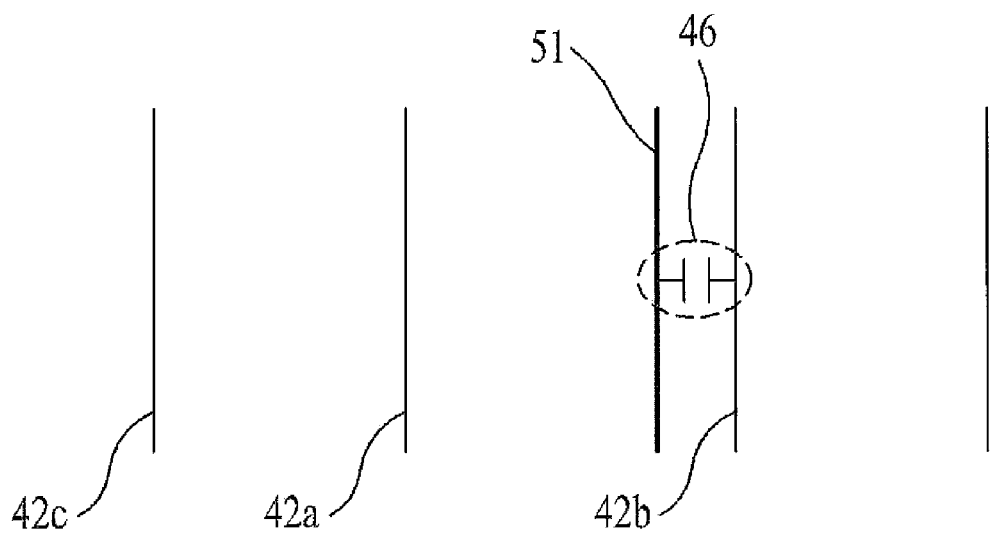
FIG. 3 schematically shows a parasitic capacitance problem generated between a read-out line and a neighboring data line of FIG. 2.
Figure 4:
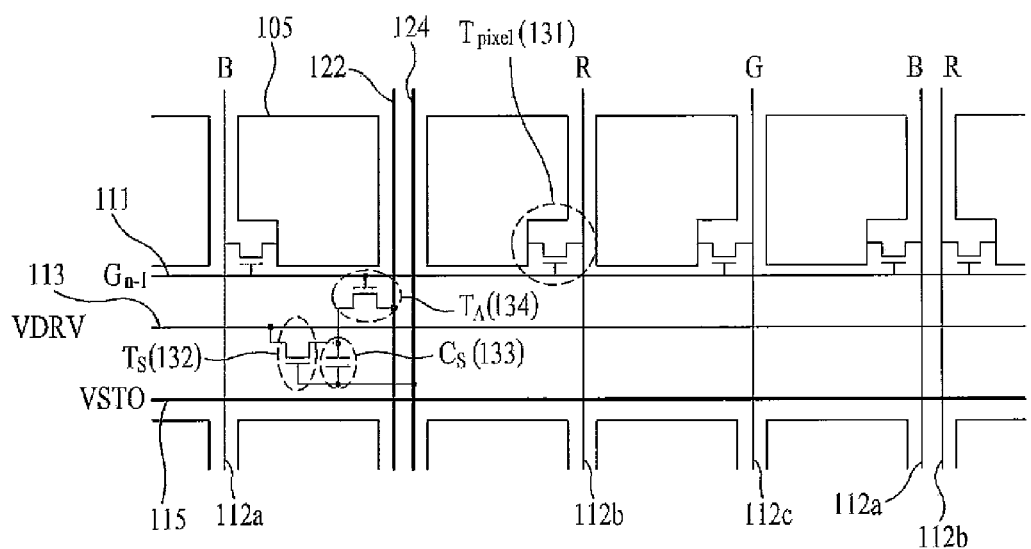
FIG. 4 illustrates a circuit diagram showing a liquid crystal display device according to the present invention.

FIG. 4 illustrates a circuit diagram showing the liquid crystal display device according to the present invention.

As shown in FIG. 4, the liquid crystal display device according to the present invention includes a first substrate 100 (see FIGS. 6A and 6B) and a second substrate facing each other to include a plurality of pixel regions spaced from each other, and a liquid crystal layer (not shown) filled between the first and second substrates. The first substrate 100 includes gate lines 111 formed to separate the pixel regions in a first direction, driving voltage lines 113 and first storage lines 115 parallel to the gate lines 111 and spaced from each other, data lines 112a, 112b and 112c, read-out lines 122 and second storage lines 124 formed between the pixel regions in a second direction intersecting the first direction, display transistors (Tpixel) 131 formed at intersecting portions of the gate lines 111 and the data lines 112a, 112b and 112c, pixel electrodes 105 formed in the pixel regions, and touch sensing portions formed between the gate lines 111, driving voltage lines 113, first storage lines 115, the read-out lines 122, and the second storage lines 124.

Specifically, each of the touch sensing portions includes an output switching transistor (Ta) 134 having a gate electrode connected to the gate line 111 and a drain electrode connected to the read-out line 122, a capacitor (Cs) 133 formed between a source electrode of the output switching transistor (Ta) 134 and the first storage line 115, and a photo sensing transistor (Ts) 132 having a gate electrode connected to the second storage line 124, a source electrode connected to the driving voltage line 113 and a drain electrode connected to the source electrode of the output switching transistor (Ta) 134.

In this case, the second storage line 124 and the read-out line 122 are formed between the neighboring pixel regions. Accordingly, it is possible to prevent the data lines 112 and the read-out line 122 from being positioned adjacent to each other compared to a conventional configuration. That is, the read-out line 122 and the second storage line 124 are formed to be spaced from each other between the pixel regions at the same location, and are separated from the neighboring data lines 112a and 112b by one pixel region, respectively.

The data lines includes first to third data lines 112b, 112c and 112a to which signals for displaying red, green and blue colors are applied respectively. The read-out line 122 and the second storage line 124 are formed between the pixel regions between the third data line 112a and the first data line 112b.

In the liquid crystal display device according to the embodiment of the present invention, the read-out line 122 and the second storage line 124 are spaced from the data lines by at least one pixel region, thereby preventing vertical crosstalk generated due to adjacency to the data lines in a vertical direction.

Particularly, it is possible to prevent coupling generated when the data lines 112a, 112b and 112c and the read-out lines 122 are formed adjacent to each other without other elements such as pixel electrodes. Conventionally, when the touch sensing portions are selectively formed at blue pixels and the read-out lines 122 are formed adjacent to the first data lines 112b for displaying red colors, there is a difference in brightness between the red pixel regions and other pixel regions due to coupling generated in the red pixel regions when the read-out lines 122 are adjacent to the first data lines 112b for displaying red colors. However, since the data lines are spaced from the read-out lines by at least one pixel region in the above embodiment, it is possible to prevent this phenomenon.

In this case, the second storage line is formed parallel to the data lines 112a, 112b and 112c. The second storage line is separately provided in a vertical direction to be connected to the capacitor 133 and the photo sensing transistor 132 formed at the touch sensing portion. Accordingly, since the second storage line is separately formed the first storage line 115 formed horizontally, the first and second storage lines can be operated by applying different signals. The storage capacitor Cst of the pixel is operated through the first storage line 115 and the touch sensing portion is operated through a signal applied to the second storage line 124.

Further, even though the read-out line 122 and the second storage line 124 are formed adjacent to each other, since a constant voltage of 0V is continuously applied to the second storage line 124 and the read-out line 122 is a detection line, the coupling hardly occurs.

The pixel regions applied to the data lines 112a, 112b and 112c are formed to have the same size.

Further, the pixel electrodes 105 formed at the left side of the read-out line 122 and the right side of the second storage line 124 are connected to the third data line 112a and the first data line 112b formed at the left and right sides, respectively. The display transistors Tpixel, formed at the left and right pixel regions, are formed at the left and right sides in different directions, respectively.

Further, the read-out line 122 and the second storage line 124 are provided at the same location. When the red, green and blue pixel regions are defined as one pixel, a plurality of the pixel regions form a plurality of pixels.

The first to third data lines 112a, 112b and 112c are repeatedly arranged according to pixels in order. The read-out line 122 and the second storage line 124 are formed at a position between the third data line 112a and the first data line 112b in each of n (natural number) pixels.

The operation of the touch sensing portion is described.

That is, a driving voltage of 12V is applied to the source electrode of the switching transistor (Ts) 132 through the driving voltage line 113, and a voltage of 0V is applied to the gate electrode of the switching transistor (Ts) 132 through the first storage line 115. When a certain amount of light is sensed in an active layer of the switching transistor (Ts) 132, photo current is generated to flow from the source electrode to the drain electrode of the switching transistor (Ts) 132 through a channel according to the sensed light amount. The photo current flows to the capacitor (Cs) 133 through the drain electrode of the switching transistor (Ts) 132. Accordingly, charges generated by the photo current are accumulated in the capacitor Cs by the driving voltage line 113 and the first storage line 115. The charges accumulated in the capacitor Cs flow to the read-out line 122 through the first thin film transistor Ta to be detected by a detection unit (read out IC) connected to the read-out line 122. It is determined whether a touch is made based on the value of the photo current.

That is, a signal detected in the detection unit connected to the read-out line 122 is changed according to the light amount sensed in the switching transistor (Ts). Accordingly, it is possible to sense an image, for example, a document, image scan, and touch input. The sensed image may be transmitted to a controller or the like or displayed on the screen of the liquid crystal display panel under the control of the user.

Hereinafter, the liquid crystal display device according to the present invention will be described in detail with reference to the drawings.

Figure 5:
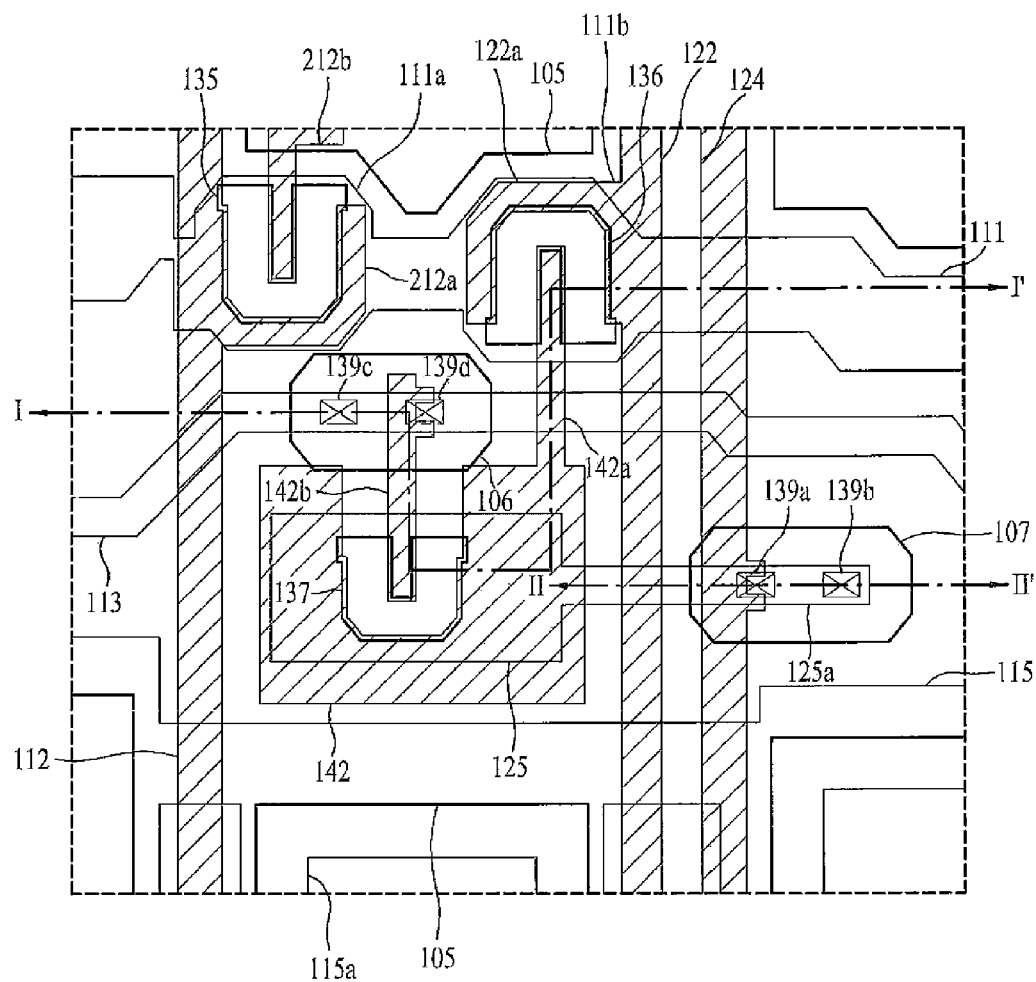
FIG. 5 illustrates a plan view of the liquid crystal display device according to the present invention.
Figure 6A:
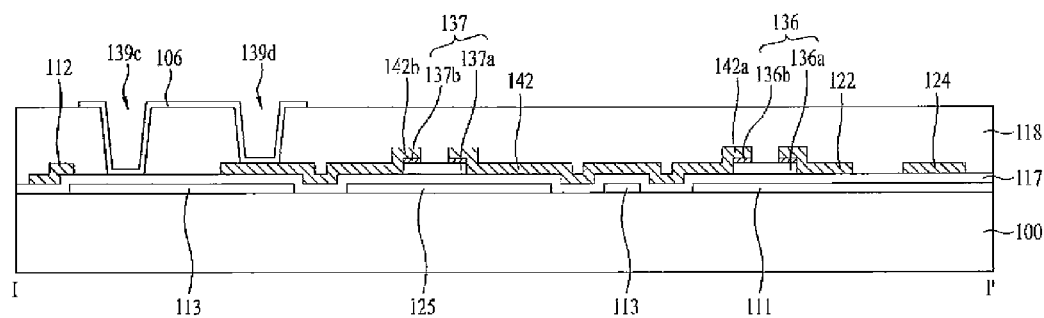
FIGS. 6A and 6B illustrate cross-sectional views of the liquid crystal display device according to the present invention.
Figure 6B:
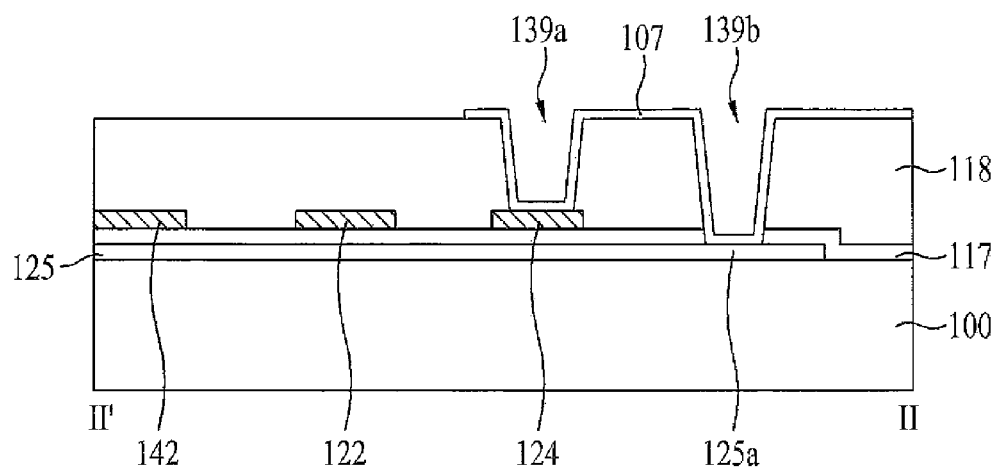

FIG. 5 illustrates a plan view of the liquid crystal display device according to the present invention. FIGS. 6A and 6B illustrate cross-sectional views of the liquid crystal display device according to the present invention.

As shown in FIGS. 5, 6A and 6B, the liquid crystal display device according to the present invention includes the gate lines 111 and the data lines 112 intersecting each other to define pixel regions. The driving voltage lines 113 and the first storage lines 115 are formed to be spaced from the gate lines 111 in parallel. Further, the read-out lines 122 and the second storage lines 124 are formed to be spaced in parallel from the data lines 112 intersecting the gate lines 111.

In this case, the display transistor Tpixel includes a gate electrode 111a formed to be protruded from the gate line 111, a source electrode 212a formed to be protruded in a 'U' shape from the data lines 112 to the gate electrode 111a, and a drain electrode 212b spaced from the source electrode 212a. Further, there is provided a first semiconductor layer 135 having a U-shaped channel between the source electrode 212a and the drain electrode 212b.

The output switching transistor (Ta) includes a gate electrode 111b protruded from the other region of the gate line 111, a drain electrode 122a formed to be protruded in a 'U' shape from the read-out line 122, and a source electrode 142a protruded from a second metal electrode 142 formed on the same layer as the source/drain electrodes 212a and 212b formed between the first storage line 115 and the driving voltage line 113. In this case, there is provided a second semiconductor layer 136 having a U-shaped channel between the drain electrode 122a and the source electrode 142a.

Further, a first metal electrode 125 is formed on the same layer as the gate line 111 under the second metal electrode 142. The first metal electrode 125 further includes a protrusion pattern 125a protruded in a direction intersecting the read-out line 122 and the second storage line 124.

Further, a first transparent electrode pattern 106, passing by a specific portion of the driving voltage line 113, and a second transparent electrode pattern 107, passing by both the second storage line 124 and the protrusion pattern 125a, are formed as transparent electrodes such as indium tin oxide (ITO) on the same layer as the pixel electrode 105.

The first transparent electrode pattern 106 has an electrical contact with the driving voltage line 113 through a third contact hole 139c, and has an electrical contact with a second metal subpattern 142b formed on the first metal electrode 125 through a fourth contact hole 139d.

Further, the pixel electrodes 105 are formed in the pixel regions, respectively. A light blocking pattern 115a is formed to be protruded from the first storage line 115 to cover a boundary portion of the pixel electrode 105. The storage capacitor Cst is formed at an overlapping portion of the light blocking pattern 115a and the pixel electrode 105.

The first metal electrode 125 is further formed on the same layer as the gate line 111 under the second metal electrode 142. The first metal electrode 125 further includes the protrusion pattern 125a protruded while intersecting the read-out line 122 and the second storage line 124.

Further, the protrusion pattern 125a is electrically connected to the second storage line 124 through a first contact hole 139a, and is electrically connected to the second transparent electrode pattern 107 through a second contact hole 139b.

Further, the second metal sub-pattern 142b serves as the drain electrode of the photo sensing transistor, and the second metal electrode 142 serves as the source electrode of the photo sensing transistor. The photo sensing transistor is formed to include a third semiconductor layer 137 and the first metal electrode 125 provided under the third semiconductor layer 137. In this case, the second metal sub-pattern 142b is connected to the driving voltage line 113 through the fourth contact hole 139d such that a driving voltage is applied thereto. A storage voltage is applied to the first metal electrode 125 from the second storage lines 124 through the first contact hole 139a.

In this case, a constant voltage ranging from 5V to 25V is applied through the driving voltage line 113. A voltage ranging from −10V to 5V is applied to the first and second storage lines 115 and 124.

The driving voltage applied through the driving voltage line 113 and the storage voltage applied through the first and second storage lines 115 and 124 may be changed according to the photo sensing transistor 132, the parasitic capacitance of the read-out line 122, the performance (mainly relating to OP amp) of the detection unit connected to an end of the read-out line 122, the latitude, the transmittance of the panel, the illuminance of the backlight unit and the like.

Referring to FIGS. 6A and 6B, in a cross sectional view, the gate line 111, the first storage line 115, the driving voltage line 113, the first metal electrode 125, the gate electrodes 111a and 111b protruded therefrom, the protrusion pattern 125a, and the light blocking pattern 115a are formed of first metal on the same layer.

Then, a gate insulating film 117 is formed on the entire surface of the structure made of the first metal.

Further, the first to third semiconductor layers 135, 136 and 137 are formed on the gate insulating film 117 above a specific portion of the first metal electrode 125 and the gate electrodes 111a and 111b.

Further, the data lines 112, the read-out line 122, the second storage line 124, the second metal electrode 142, the source electrodes 212a and 142a protruded therefrom, the second metal sub-pattern 142b and the drain electrodes 212b and 122a are formed of second metal on the same layer. In this case, the source electrodes 212a, 142a and 142 and the drain electrodes 212b, 142b and 142a are formed at the opposite sides of the first to third semiconductor layers 135, 136 and 137, respectively.

Further, a passivation film 118 is formed on the entire surface of the gate insulating film 117 including the data lines 112, the read-out line 122, the second storage line 124, the second metal electrode 142, the source electrodes 212a and 142a, the second metal sub-pattern 142b and the drain electrodes 212b and 122a.

Then, the passivation film 118 is selectively removed to define the first to fourth contact holes 139a, 139b, 139c and 139d.

The second transparent electrode pattern 107 formed at a region of the passivation film 118 including the first and second contact holes 139a and 139b is electrically connected to the second storage line 124 and the protrusion pattern 125a. The first transparent electrode pattern 106 formed at a region of the passivation film 118 including the third and fourth contact holes 139c and 139d is electrically connected to the driving voltage line and the second metal sub-pattern 142b.

In this case, the gate insulating film 117 and the passivation film 118 employ a low-k organic insulating film made of photoacryl or benzocyclobutene (BCB), thereby preventing parasitic coupling between the read-out line 122 and the neighboring electrodes.

A black matrix layer of the second substrate corresponding to the photo sensing transistor 132 is removed to maintain an open state, thereby sensing external light.

In this case, the second substrate (facing substrate) further includes black matrix layers (not shown) covering the gate lines 111, the data lines 112 and the display transistors (Tpixel) 131, and red, green and blue color filter layers (not shown) formed corresponding to the pixel regions. Also, common electrodes (not shown) are formed on the entire surface of the second substrate including the black matrix layers and the color filter layers.

Further, the first metal electrode 125 serving as the gate electrode of the photo sensing transistor 132 is formed on the same layer as the gate line 111. The first metal electrode 125 is electrically connected to the second storage line 124 through the fourth contact hole 139d such that a storage voltage is applied thereto. Further, the second metal electrode 142 serving as the drain electrode of the photo sensing transistor 132 is formed on the same layer as the data lines to have a larger area than the first metal electrode 125 while covering the first metal electrode 125. When the photo sensing transistor 132 is formed, the light blocking second metal electrode 142 is formed to have a large area with regard to the margin of cell bonding in order to prevent light leakage at the photo sensing transistor 132. Occasionally, the first metal electrode 125 may have a larger area than the second metal electrode 142. In both cases, the first and second metal electrodes 125 and 142 and the black matrix layer can prevent light emitted from a lower light source provided under the first substrate 100 from being incident onto the photo sensing transistor 132.

The liquid crystal display device according to the embodiment of the present invention may be formed using a five-mask or four-mask process without an additional mask process.

Further, the read-out line is spaced from the neighboring data lines by an area for forming at least one pixel electrode to prevent coupling therebetween and reduce the parasitic capacitance due to fringe field, thereby minimizing a difference in brightness between red, green and blue pixels.

Further, the first storage line serving as one electrode of the storage capacitor of the pixel is separated from the second storage line for sensing a touch, thereby minimizing an influence of the liquid crystal capacitance on touch sensing. Occasionally, the horizontal first storage line 115 may be removed and the storage capacitor may be formed by overlapping the previous gate line with the pixel electrode.

Further, although the read-out line 122 and the second storage line 124 are provided at the same location (between the same pixel regions) in the above embodiment, the read-out line 122 and the second storage line 124 may be provided at different positions (between different pixel regions). Even in the latter case, the read-out line 122 is formed to be spaced from the neighboring data lines by at least one pixel region.

In the above embodiment, the touch sensing portions are positioned at the blue pixel regions. However, the touch sensing portions may be alternately positioned at blue, red and green pixel regions in order to reduce a difference in brightness according to colors.

Figure 7:
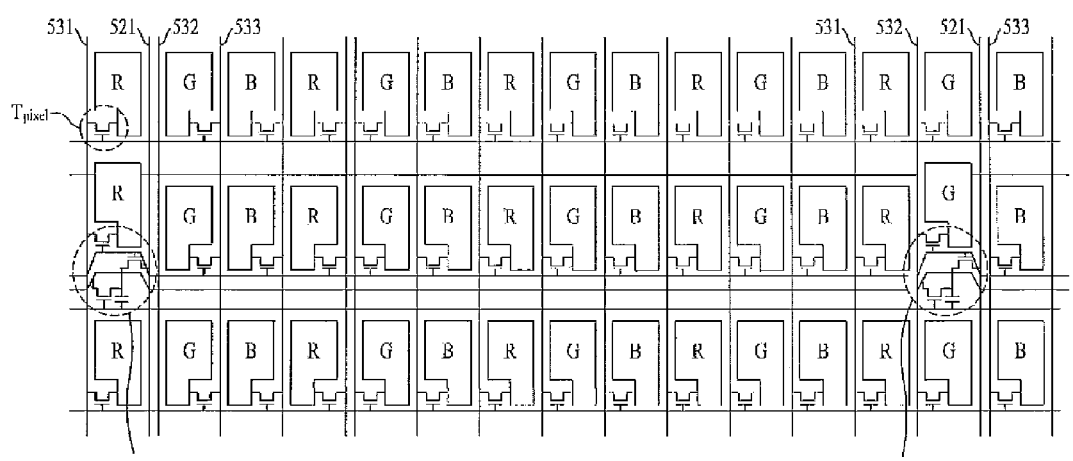
FIG. 7 illustrates a circuit diagram showing a liquid crystal display device according to a second embodiment of the present invention.

FIG. 7 illustrates a circuit diagram showing the liquid crystal display device according to a second embodiment of the present invention.

In the second embodiment of FIG. 7, a first sensing portion 510 for sensing a touch is formed at a red pixel, and a second sensing portion 511 for sensing a next touch is formed at a green pixel.

According to the second embodiment, the touch sensing portions are alternately formed at red, green and blue pixel regions. When three red, green and blue pixel regions are defined as one pixel and the touch sensing portion is formed for each of four pixels, the next sensing portion is formed at the next pixel region at the corresponding pixel. For example, when the touch sensing portion is formed for each of four pixels, the sensing portion is provided for each of thirteen pixel regions. That is, the sensor is positioned at the pixel region (sub-pixel) of the next color after skipping four pixels. Accordingly, when one sensor is positioned for each of thirteen sub-pixels and a sensor is initially positioned at a red pixel region, the next touch sensing portion is positioned at a green pixel region, and the next touch sensing portion is positioned at a blue pixel region.

In the same way, when n is a natural number, the sensing portion is formed for each of 3n+1 pixel regions. In this case, 3n is determined based on the fact that red, green and blue pixel regions are formed in one pixel.

Generally, a difference according to colors is generated when the sensors are positioned only at blue pixel regions. Accordingly, in the second embodiment, the touch sensing portions are alternately positioned at RGB pixel regions to remove a difference according to colors.

In the latest model of 7-inch WVGA LCD, one touch sensing portion is provided for each of four pixels for pen writing. A sensor resolution is 33 PPI and a sensor interval is about 0.78 mm.

As described above, since signals of red, green and blue data lines alternately influence the sensor output lines, it is possible to reduce a sensing difference according to colors. In a horizontal direction, one touch sensing portion is positioned for each of about four pixels to maintain a conventional sensor resolution. When one sensor is provided for each of thirteen pixel regions, a sensor interval is about 0.85 mm, which is sufficient for pen writing. Further, since an opening ratio of the pixel regions is maintained at the same level as the conventional case, application can be achieved without reduction in an opening ratio.

In this case, the sensing portions 510 and 511 (formed in an X direction) are provided at the same number for each of red, green and blue pixel regions to offer the same influence onto the red, green and blue pixel regions. The optical sensor is variable according to the sensor resolution.

In a Y direction parallel to the data lines, the sensing portions 510 and 511 are positioned at the same pixel regions. Accordingly, it is possible to minimize the number of lines for connecting the sensor lines to the read-out lines, thereby reducing the number of IC channels and minimizing the number of ICs.

Preferably, the black matrix layers of all pixels are designed to have the same size as the pixels having sensors to eliminate a difference in display between pixels having sensing portions and pixels having no sensing portions.

Figure 8:
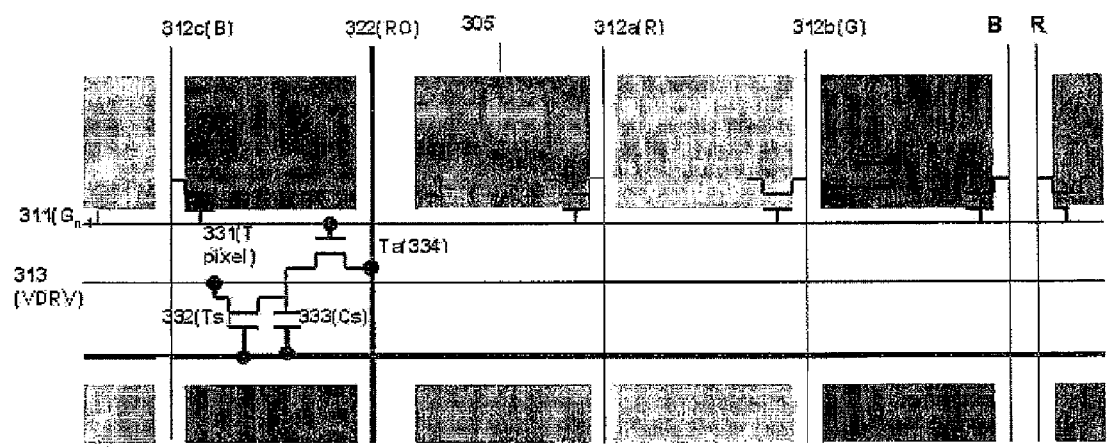
FIG. 8 illustrates a circuit diagram showing a liquid crystal display device according to a third embodiment of the present invention.

FIG. 8 illustrates a circuit diagram showing a liquid crystal display device according to a third embodiment of the present invention.

As shown in FIG. 8, the liquid crystal display device according to the third embodiment of the present invention includes a first substrate (not shown) and a second substrate (not shown) facing each other to include a plurality of pixel regions spaced from each other, and a liquid crystal layer (not shown) filled between the first and second substrates.

The first substrate includes gate lines 311 formed to separate the pixel regions in a first direction, driving voltage lines 313 and first storage lines 315 parallel to the gate lines 311 and spaced from each other, data lines 312a, 312b and 312c formed between the pixel regions in a second direction intersecting the first direction, read-out lines 322, display transistors (Tpixel) 331 formed at intersecting portions of the gate lines 311 and the data lines 312a, 312b and 312c, pixel electrodes 305 formed in the pixel regions, and touch sensing portions formed between the gate lines 311, driving voltage lines 313, storage lines 315 and the read-out lines 322.

Specifically, each of the touch sensing portions includes an output switching transistor (Ta) 334 having a gate electrode connected to the gate line 311 and a drain electrode connected to the read-out line 322, a capacitor (Cs) 333 formed between a source electrode of the output switching transistor (Ta) 334 and the storage line 315, and a photo sensing transistor (Ts) 332 having a gate electrode connected to the storage line 315, a source electrode connected to the driving voltage line 313 and a drain electrode connected to the source electrode of the output switching transistor (Ta) 334.

In this case, the read-out line 322 is formed between the neighboring pixel regions. Accordingly, it is possible to prevent the data lines 312 and the read-out line 322 from being positioned adjacent to each other compared to a conventional configuration. That is, the read-out line 322 is formed to be spaced from the data lines 312 at the same location between the pixel regions, and is separated from the neighboring data lines 312a and 312c by one pixel region, respectively.

The data lines includes first to third data lines 312a, 312b and 312c to which signals for displaying red, green and blue colors are applied respectively. The read-out line 322 is formed between the pixel regions between the third data line 312c and the first data line 312a.

In the liquid crystal display device according to the third embodiment, the read-out line 322 is spaced from the neighboring data lines by at least one pixel region, thereby preventing vertical crosstalk generated due to adjacency to the data lines in a vertical direction.

Particularly, it is possible to prevent coupling generated when the data lines 312a, 312b and 312c and the read-out lines 322 are formed adjacent to each other without other elements such as pixel electrodes. Conventionally, when the touch sensing portions are selectively formed at blue pixels and the read-out lines 322 are formed adjacent to the first data lines 312a for displaying red colors, there is a difference in brightness between the red pixel regions and other pixel regions due to coupling generated in the red pixel regions when the read-out lines 322 are adjacent to the first data lines 312a for displaying red colors. However, since the data lines are spaced from the read-out lines by at least one pixel region in the third embodiment, it is possible to prevent this phenomenon.

The third embodiment is different from the first embodiment in that only one storage line is formed parallel to the gate line. In this case, since the read-out line is spaced from the data lines by at least one pixel region, it is possible to prevent crosstalk occurring due to the parasitic capacitance generated between the read-out line and the data lines. The storage line may overlap a portion of the pixel electrode to form a storage capacitor.

The pixel regions applied to the first to third data lines 312a, 312b and 312c are formed to have the same size.

Further, the pixel electrodes 305 formed at the left and right sides of the read-out line 322 are connected to the third data line 312c and the first data line 312a formed at the left and right sides, respectively. The display transistors Tpixel, formed at the left and right pixel regions, are formed at the left and right sides in different directions, respectively.

Further, when the red, green and blue pixel regions are defined as one pixel, a plurality of the pixel regions form a plurality of pixels. The first to third data lines 312a, 312b and 312c are repeatedly arranged according to pixels in order. The read-out line 322 is formed in each of n (natural number) pixels. The read-out line 322 may be formed at a position between the third data line 312c and the first data line 312a, or may be alternately formed at the red, green and blue pixel regions. Experimentally, in the latter case, uniform photo sensing can be achieved without a difference in brightness according to colors.

The operation of the touch sensing portion in the third embodiment is the same as in the first embodiment.

The liquid crystal display device according to the present invention has the following effects.

First, the data lines and the read-out line are separated from each other by at least one pixel region.

Accordingly, it is possible to reduce a coupling phenomenon of the read-out line due to data signals, and it is possible to sharply reduce vertical crosstalk on the screen in a sensing operation.

Second, the first storage line serving as a common line of the pixels and the second storage line for sensing a touch are separately arranged in horizontal and vertical directions, respectively. Accordingly, it is possible to reduce load of the touch sensing portion connected to the second storage line, thereby reducing a distortion phenomenon. Further, since the second storage line is formed separately from the first storage line for the storage capacitor, it is possible to prevent influence of the liquid crystal capacitor (Clc) in a touch sensing operation.

Third, the positions of the data lines according to colors are adjusted, and the read-out line and the second storage line are formed between the pixel regions. Accordingly, it is possible to provide an optical sensor type touch sensing portion without loss of an opening ratio and generation of crosstalk.

Fourth, the touch sensing portions are alternately arranged at red, green and blue pixel regions. Accordingly, it is possible to reduce a difference in brightness, which may be generated when the touch sensing portions are arranged at the pixel regions having the same color. That is, it is possible to remove a touch sensing difference and malfunction generated due to a difference in the sensing screen according to colors in application of a touch algorithm, thereby contributing to future development of in-cell touch technology relating to optical sensors.

Fifth, since the touch sensing portions are formed inside the thin film transistor array, the optical sensors can be formed by a process for forming a thin film transistor array without attachment of additional sensors. Accordingly, it is possible to manufacture a slim liquid crystal panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a plurality of pixel regions arranged on a first substrate to be spaced from each other;
   gate lines formed to separate the pixel regions in a first direction;
   driving voltage lines parallel to the gate lines;
   data lines formed between the pixel regions in a second direction intersecting the first direction;
   storage lines parallel to the driving voltage lines;
   read-out lines in the second direction, the read-out lines being separated from neighboring data lines by one pixel region;
   display transistors formed at intersecting portions of the gate lines and the data lines;
   pixel electrodes formed in the pixel regions;
   output switching transistors formed between the gate lines and the read-out lines;
   capacitors formed between the output switching transistors and the storage lines; and
   photo sensing transistors formed on the output switching transistors and the storage lines,
   wherein the data lines include first to third data lines to which signals for displaying red, green and blue colors are applied respectively, and
   the pixel regions are formed such that red, green and blue pixel regions are arranged in order, and the read-out lines are alternately and uniformly formed at the red, green and blue pixel regions.

2. The liquid crystal display device according to claim 1, wherein the output switching transistors have gate electrodes connected to the gate lines and drain electrodes connected to the read-out lines, and
   the photo sensing transistors have gate electrodes connected to the storage lines, source electrodes connected to the driving voltage lines and drain electrodes connected to source electrodes of the output switching transistors.

3. The liquid crystal display device according to claim 1, wherein the driving voltage lines are formed on the same layer as the gate lines.

4. The liquid crystal display device according to claim 1, wherein the read-out lines are formed on the same layer as the data lines.

5. The liquid crystal display device according to claim 1, wherein the pixel electrodes are formed to have the same size.

6. A liquid crystal display device comprising:
   a plurality of pixel regions arranged on a first substrate to be spaced from each other;
   gate lines formed to separate the pixel regions in a first direction;
   driving voltage lines parallel to the gate lines;
   data lines, read-out lines and storage lines formed between the pixel regions in a second direction intersecting the first direction;
   display transistors formed at intersecting portions of the gate lines and the data lines;
   pixel electrodes formed in the pixel regions;
   output switching transistors formed between the gate lines and the read-out lines;
   capacitors formed between the output switching transistors and the storage lines; and
   photo sensing transistors formed on the output switching transistors and the storage lines,
   wherein the read-out lines and the storage lines are formed between the pixel regions at the same location to be spaced from each other, and are separated from neighboring data lines by one pixel region.

7. The liquid crystal display device according to claim 6, wherein each of the read-out lines and each of the storage lines are provided for each of 3n+1 (n is a natural number) pixel regions.

8. The liquid crystal display device according to claim 7, further comprising:
   a second substrate facing the first substrate;
   black matrix layers formed on the second substrate to cover the gate lines, the data lines and the display transistors; and
   red, green and blue color filter layers formed corresponding to the pixel regions.

9. The liquid crystal display device according to claim 8, wherein gate electrodes of the photo sensing transistors are electrically connected to the storage lines, and are made of first metal electrodes formed on the same layer as the gate lines,
   drain electrodes of the photo sensing transistors are connected to the source electrodes of the output switching transistors, which are made of second metal electrodes formed on the same layer as the data lines to cover the first metal electrodes, and
   the first metal electrodes, the second metal electrodes and the black matrix layers prevent light emitted from a lower portion of the first substrate from being incident onto the photo sensing transistors.

* * * * *